US012721371B2

(12) United States Patent
Sears et al.

(10) Patent No.: US 12,721,371 B2
(45) Date of Patent: Sep. 1, 2026

(54) ELECTRICALLY-POWERED AEROSOL DELIVERY SYSTEM

(71) Applicant: RAI Strategic Holdings, Inc., Winston-Salem, NC (US)

(72) Inventors: Stephen Benson Sears, Siler City, NC (US); Karen V. Taluskie, Winston-Salem, NC (US); Michael F. Davis, Clemmons, NC (US); Balager Ademe, Winston-Salem, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 913 days.

(21) Appl. No.: 17/551,321

(22) Filed: Dec. 15, 2021

(65) Prior Publication Data

US 2022/0167669 A1 Jun. 2, 2022

Related U.S. Application Data

(63) Continuation of application No. 14/282,768, filed on May 20, 2014, now abandoned.

(51) Int. Cl.
*A24F 40/30* (2020.01)
*A24D 3/06* (2006.01)
(Continued)

(52) U.S. Cl.
CPC .............. *A24F 40/30* (2020.01); *A24D 3/061* (2013.01); *A24D 3/17* (2020.01); *A24F 40/10* (2020.01);
(Continued)

(58) Field of Classification Search
None
See application file for complete search history.

(56) References Cited

U.S. PATENT DOCUMENTS 1,771,366 A 7/1930 Wyss et al.
2,033,909 A 3/1936 Cox et al.
(Continued)

FOREIGN PATENT DOCUMENTS

AU 276250 7/1965
AU 2015264310 B2 11/2015
(Continued)

OTHER PUBLICATIONS

CN-105852218-A translation (Year: 2016).*
(Continued)

*Primary Examiner* — Michael J Felton
(74) *Attorney, Agent, or Firm* — Womble Bond Dickinson (US) LLP

(57) ABSTRACT

An aerosol delivery system is provided, comprising a control body portion including a first elongate tubular member having a power source disposed therein. A cartridge body portion includes a second tubular member having opposed first and second ends. One of the first and second ends is removably engaged with one end of the control body portion. The cartridge body portion further comprises a first aerosol generation arrangement disposed within the second tubular member and configured to operably engage the power source upon engagement between the control body portion and the cartridge body portion. The other of the first and second ends of the cartridge body portion is configured as a mouth-engaging end. The cartridge body portion further includes a second aerosol generation arrangement disposed within the second tubular member between the first aerosol generation arrangement and the mouth-engaging end. An associated method is also provided.

18 Claims, 5 Drawing Sheets

(51) Int. Cl.
*A24D 3/17* (2020.01)
*A24F 40/10* (2020.01)
*A24F 40/20* (2020.01)
*A24F 40/40* (2020.01)
*A24F 40/42* (2020.01)
*H05B 1/02* (2006.01)
*H05B 3/14* (2006.01)

(52) U.S. Cl.
CPC .............. *A24F 40/40* (2020.01); *A24F 40/42* (2020.01); *H05B 1/0244* (2013.01); *H05B 1/0288* (2013.01); *H05B 3/145* (2013.01); *A24F 40/20* (2020.01); *H05B 2203/018* (2013.01); *H05B 2203/021* (2013.01)

(56) References Cited

U.S. PATENT DOCUMENTS 2,057,353 A 10/1936 Whittemore, Jr.
2,104,266 A 1/1938 McCormick
2,685,883 A 8/1954 Schlumbohm
3,200,819 A 8/1965 Gilbert
3,251,365 A 5/1966 Keith et al.
3,470,883 A 10/1969 Shepherd et al.
3,901,248 A 8/1975 Lichtneckert et al.
4,284,089 A 8/1981 Ray
4,303,083 A 12/1981 Burruss, Jr.
4,434,804 A 3/1984 Bolt et al.
4,735,217 A 4/1988 Gerth et al.
4,793,365 A 12/1988 Sensabaugh, Jr. et al.
4,848,374 A 7/1989 Chard et al.
4,893,639 A 1/1990 White
4,907,606 A 3/1990 Lilja et al.
4,922,901 A 5/1990 Brooks et al.
4,924,883 A 5/1990 Perfetti et al.
4,945,931 A 8/1990 Gori
4,947,874 A 8/1990 Brooks et al.
4,947,875 A 8/1990 Brooks et al.
4,986,286 A 1/1991 Roberts et al.
4,989,619 A 2/1991 Clearman et al.
4,991,606 A 2/1991 Serrano et al.
5,019,122 A 5/1991 Clearman et al.
5,042,510 A 8/1991 Curtiss et al.
5,060,671 A 10/1991 Counts et al.
5,093,894 A 3/1992 Deevi et al.
5,099,861 A 3/1992 Clearman et al.
5,101,839 A 4/1992 Jakob et al.
5,105,831 A 4/1992 Banerjee et al.
5,105,836 A 4/1992 Gentry et al.
5,144,962 A 9/1992 Counts et al.
5,154,192 A 10/1992 Sprinkel et al.
5,159,942 A 11/1992 Brinkley et al.
5,203,355 A 4/1993 Clearman et al.
5,224,498 A 7/1993 Deevi et al.
5,228,460 A 7/1993 Sprinkel et al.
5,249,586 A 10/1993 Morgan et al.
5,261,424 A 11/1993 Sprinkel, Jr.
5,271,419 A 12/1993 Arzonico et al.
5,322,075 A 6/1994 Deevi et al.
5,327,917 A 7/1994 Lekwauwa et al.
5,353,813 A 10/1994 Deevi et al.
5,369,723 A 11/1994 Counts et al.
5,372,148 A 12/1994 McCafferty et al.
5,388,574 A 2/1995 Ingebrethsen et al.
5,396,911 A 3/1995 Casey, III et al.
5,408,574 A 4/1995 Deevi et al.
5,468,936 A 11/1995 Deevi et al.
5,469,871 A 11/1995 Barnes et al.
5,498,850 A 3/1996 Das
5,498,855 A 3/1996 Deevi et al.
5,515,842 A 5/1996 Ramseyer et al.
5,530,225 A 6/1996 Hajaligol
5,533,530 A 7/1996 Young et al.
5,564,442 A 10/1996 MacDonald et al.
5,573,692 A 11/1996 Das et al.
5,588,446 A 12/1996 Clearman
5,591,368 A 1/1997 Fleischhauer et al.
5,598,868 A 2/1997 Jakob et al.
5,649,554 A 7/1997 Sprinkel et al.
5,659,656 A 8/1997 Das
5,665,262 A 9/1997 Hajaligol et al.
5,666,977 A 9/1997 Higgins et al.
5,687,746 A 11/1997 Rose et al.
5,715,844 A 2/1998 Young et al.
5,726,421 A 3/1998 Fleischhauer et al.
5,727,571 A 3/1998 Meiring et al.
5,743,251 A 4/1998 Howell et al.
5,799,663 A 9/1998 Gross et al.
5,819,756 A 10/1998 Mielordt
5,865,185 A 2/1999 Collins et al.
5,865,186 A 2/1999 Volsey, II
5,878,752 A 3/1999 Adams et al.
5,894,841 A 4/1999 Voges
5,934,289 A 8/1999 Watkins et al.
5,954,979 A 9/1999 Counts et al.
5,967,148 A 10/1999 Harris et al.
6,040,560 A 3/2000 Fleischhauer et al.
6,053,176 A 4/2000 Adams et al.
6,089,857 A 7/2000 Matsuura et al.
6,095,153 A 8/2000 Kessler et al.
6,125,853 A 10/2000 Susa et al.
6,155,268 A 12/2000 Takeuchi
6,164,287 A 12/2000 White
6,196,218 B1 3/2001 Voges
6,196,219 B1 3/2001 Hess et al.
6,598,607 B2 7/2003 Adiga et al.
6,601,776 B1 8/2003 Oljaca et al.
6,615,840 B1 9/2003 Fournier et al.
6,688,313 B2 2/2004 Wrenn et al.
6,772,756 B2 8/2004 Shayan
6,803,545 B2 10/2004 Blake et al.
6,854,461 B2 2/2005 Nichols
6,854,470 B1 2/2005 Pu
7,040,314 B2 5/2006 Nguyen et al.
7,117,867 B2 10/2006 Cox et al.
7,217,320 B2 5/2007 Kim et al.
7,293,565 B2 11/2007 Griffin et al.
7,513,253 B2 4/2009 Kobayashi et al.
7,647,932 B2 1/2010 Cantrell et al.
7,726,320 B2 6/2010 Robinson et al.
7,775,459 B2 8/2010 Martens, III et al.
7,832,410 B2 11/2010 Hon
7,845,359 B2 12/2010 Montaser
7,896,006 B2 3/2011 Hamano et al.
8,127,772 B2 3/2012 Montaser
8,205,622 B2 6/2012 Pan
8,314,591 B2 11/2012 Terry et al.
8,365,742 B2 2/2013 Hon
8,402,976 B2 3/2013 Fernando et al.
8,424,538 B2 4/2013 Thomas et al.
8,430,106 B2 4/2013 Potter et al.
8,459,272 B2 6/2013 Karles et al.
8,464,726 B2 6/2013 Sebastian et al.
8,469,035 B2 6/2013 Banerjee et al.
8,499,766 B1 8/2013 Newton
8,528,569 B1 9/2013 Newton
8,539,959 B1 9/2013 Scatterday
8,550,069 B2 10/2013 Alelov
8,617,263 B2 12/2013 Banerjee et al.
8,671,951 B2 3/2014 Ercelebi et al.
8,678,013 B2 3/2014 Crooks et al.
8,689,804 B2 4/2014 Fernando et al.
8,752,545 B2 6/2014 Buchberger
8,839,799 B2 9/2014 Conner et al.
9,004,073 B2 4/2015 Tucker et al.
9,484,155 B2 11/2016 Peckerar et al.
9,554,595 B2 1/2017 Buchberger
2002/0146242 A1 10/2002 Vieira
2003/0226837 A1 12/2003 Blake et al.
2004/0118401 A1 6/2004 Smith et al.
2004/0129280 A1 7/2004 Woodson et al.
2004/0173229 A1 9/2004 Crooks et al.
2004/0191322 A1 9/2004 Hansson
2004/0200488 A1 10/2004 Felter et al.

(56) References Cited

U.S. PATENT DOCUMENTS

| | | | | |
|---|---|---|---|---|
| 2004/0226568 | A1 | 11/2004 | Takeuchi et al. | |
| 2005/0016550 | A1 | 1/2005 | Katase | |
| 2005/0066986 | A1 | 3/2005 | Nestor et al. | |
| 2006/0016453 | A1 | 1/2006 | Kim | |
| 2006/0191546 | A1 | 8/2006 | Takano et al. | |
| 2006/0196518 | A1* | 9/2006 | Hon | A24B 15/167 131/347 |
| 2007/0000505 | A1 | 1/2007 | Zhuang et al. | |
| 2007/0023056 | A1 | 2/2007 | Cantrell et al. | |
| 2007/0074734 | A1 | 4/2007 | Braunshteyn et al. | |
| 2007/0102013 | A1 | 5/2007 | Adams et al. | |
| 2007/0215167 | A1 | 9/2007 | Crooks et al. | |
| 2007/0215168 | A1 | 9/2007 | Banerjee et al. | |
| 2008/0085103 | A1 | 4/2008 | Beland et al. | |
| 2008/0092912 | A1* | 4/2008 | Robinson | A24B 15/12 131/200 |
| 2008/0257367 | A1 | 10/2008 | Paterno et al. | |
| 2008/0276947 | A1 | 11/2008 | Martzel | |
| 2008/0302374 | A1 | 12/2008 | Wengert et al. | |
| 2009/0044817 | A1 | 2/2009 | Besso et al. | |
| 2009/0095311 | A1 | 4/2009 | Hon | |
| 2009/0095312 | A1 | 4/2009 | Herbrich et al. | |
| 2009/0126745 | A1 | 5/2009 | Hon | |
| 2009/0139533 | A1 | 6/2009 | Park et al. | |
| 2009/0188490 | A1 | 7/2009 | Hon | |
| 2009/0230117 | A1 | 9/2009 | Fernando et al. | |
| 2009/0272379 | A1 | 11/2009 | Thorens et al. | |
| 2009/0283103 | A1 | 11/2009 | Nielsen et al. | |
| 2009/0320863 | A1 | 12/2009 | Fernando et al. | |
| 2010/0028766 | A1 | 2/2010 | Peckerar et al. | |
| 2010/0043809 | A1 | 2/2010 | Magnon | |
| 2010/0083959 | A1 | 4/2010 | Siller | |
| 2010/0186757 | A1 | 7/2010 | Crooks et al. | |
| 2010/0200006 | A1 | 8/2010 | Robinson et al. | |
| 2010/0229881 | A1 | 9/2010 | Hearn | |
| 2010/0242974 | A1 | 9/2010 | Pan | |
| 2010/0307518 | A1 | 12/2010 | Wang | |
| 2010/0313901 | A1 | 12/2010 | Fernando et al. | |
| 2011/0005535 | A1 | 1/2011 | Xiu | |
| 2011/0011396 | A1 | 1/2011 | Fang | |
| 2011/0036363 | A1 | 2/2011 | Urtsev et al. | |
| 2011/0036365 | A1 | 2/2011 | Chong et al. | |
| 2011/0094523 | A1 | 4/2011 | Thorens et al. | |
| 2011/0126848 | A1 | 6/2011 | Zuber et al. | |
| 2011/0155153 | A1 | 6/2011 | Thorens et al. | |
| 2011/0155718 | A1 | 6/2011 | Greim et al. | |
| 2011/0168194 | A1 | 7/2011 | Hon | |
| 2011/0226236 | A1 | 9/2011 | Buchberger | |
| 2011/0265806 | A1 | 11/2011 | Alarcon et al. | |
| 2011/0268809 | A1 | 11/2011 | Brinkley et al. | |
| 2011/0271968 | A1 | 11/2011 | Carpenter et al. | |
| 2011/0271971 | A1 | 11/2011 | Serrano et al. | |
| 2011/0309157 | A1 | 12/2011 | Yang et al. | |
| 2012/0042885 | A1 | 2/2012 | Stone et al. | |
| 2012/0060853 | A1 | 3/2012 | Robinson et al. | |
| 2012/0067360 | A1 | 3/2012 | Conner et al. | |
| 2012/0111347 | A1 | 5/2012 | Hon | |
| 2012/0132643 | A1 | 5/2012 | Choi et al. | |
| 2012/0204889 | A1 | 8/2012 | Xiu | |
| 2012/0227752 | A1 | 9/2012 | Alelov | |
| 2012/0231464 | A1 | 9/2012 | Yu et al. | |
| 2012/0260927 | A1 | 10/2012 | Liu | |
| 2012/0279512 | A1 | 11/2012 | Hon | |
| 2012/0318882 | A1 | 12/2012 | Abehasera | |
| 2013/0008457 | A1 | 1/2013 | Zheng et al. | |
| 2013/0037041 | A1 | 2/2013 | Worm et al. | |
| 2013/0056013 | A1 | 3/2013 | Terry et al. | |
| 2013/0081625 | A1 | 4/2013 | Rustad et al. | |
| 2013/0081642 | A1 | 4/2013 | Safari | |
| 2013/0168880 | A1* | 7/2013 | Duke | A24F 40/90 261/78.2 |
| 2013/0180533 | A1 | 7/2013 | Kim et al. | |
| 2013/0192619 | A1 | 8/2013 | Tucker et al. | |
| 2013/0192623 | A1 | 8/2013 | Tucker et al. | |
| 2013/0213417 | A1 | 8/2013 | Chong et al. | |
| 2013/0255702 | A1 | 10/2013 | Griffith, Jr. et al. | |
| 2013/0269720 | A1 | 10/2013 | Stone et al. | |
| 2013/0284190 | A1 | 10/2013 | Scatterday et al. | |
| 2013/0298905 | A1 | 11/2013 | Levin et al. | |
| 2013/0306084 | A1 | 11/2013 | Flick | |
| 2013/0319439 | A1 | 12/2013 | Gorelick et al. | |
| 2013/0340750 | A1 | 12/2013 | Thorens et al. | |
| 2013/0340775 | A1 | 12/2013 | Juster et al. | |
| 2014/0000638 | A1 | 1/2014 | Sebastian et al. | |
| 2014/0060554 | A1 | 3/2014 | Collett et al. | |
| 2014/0060555 | A1 | 3/2014 | Chang et al. | |
| 2014/0060556 | A1 | 3/2014 | Liu | |
| 2014/0096781 | A1 | 4/2014 | Sears et al. | |
| 2014/0096782 | A1 | 4/2014 | Ampolini et al. | |
| 2014/0109921 | A1 | 4/2014 | Chen | |
| 2014/0157583 | A1 | 6/2014 | Ward et al. | |
| 2014/0209105 | A1 | 7/2014 | Sears et al. | |
| 2014/0253144 | A1 | 9/2014 | Novak et al. | |
| 2014/0261408 | A1 | 9/2014 | DePiano et al. | |
| 2014/0261486 | A1 | 9/2014 | Potter et al. | |
| 2014/0261487 | A1 | 9/2014 | Chapman et al. | |
| 2014/0261495 | A1 | 9/2014 | Novak et al. | |
| 2014/0270727 | A1 | 9/2014 | Ampolini et al. | |
| 2014/0270729 | A1 | 9/2014 | DePiano et al. | |
| 2014/0270730 | A1 | 9/2014 | DePiano et al. | |
| 2014/0299125 | A1 | 10/2014 | Buchberger | |
| 2014/0299135 | A1 | 10/2014 | Besso et al. | |
| 2014/0345631 | A1 | 11/2014 | Bowen et al. | |
| 2014/0366898 | A1 | 12/2014 | Monsees et al. | |
| 2015/0027454 | A1 | 1/2015 | Li et al. | |
| 2015/0027469 | A1 | 1/2015 | Tucker et al. | |
| 2015/0040924 | A1 | 2/2015 | Mironov et al. | |
| 2015/0053217 | A1 | 2/2015 | Steingraber et al. | |
| 2015/0059780 | A1 | 3/2015 | Davis et al. | |
| 2015/0059787 | A1 | 3/2015 | Weihua | |
| 2015/0083150 | A1 | 3/2015 | Conner et al. | |
| 2015/0196059 | A1 | 7/2015 | Liu | |
| 2015/0216232 | A1 | 8/2015 | Connor et al. | |
| 2015/0216233 | A1 | 8/2015 | Sears et al. | |
| 2015/0257445 | A1 | 9/2015 | Henry et al. | |
| 2015/0257447 | A1 | 9/2015 | Sullivan | |
| 2016/0073695 | A1 | 3/2016 | Sears et al. | |
| 2016/0150825 | A1* | 6/2016 | Mironov | A24F 40/465 219/634 |
| 2016/0205998 | A1 | 7/2016 | Matsumoto | |
| 2016/0206003 | A1 | 7/2016 | Yamada | |
| 2016/0206004 | A1* | 7/2016 | Shinkawa | B65D 85/70 |

FOREIGN PATENT DOCUMENTS

| | | | | |
|---|---|---|---|---|
| CA | 2 641 869 | | | 5/2010 |
| CA | 2 940 842 | | | 9/2015 |
| CN | 1040134 | A | | 3/1990 |
| CN | 1541577 | | | 11/2004 |
| CN | 2719043 | | | 8/2005 |
| CN | 200997909 | | | 1/2008 |
| CN | 101116542 | | | 2/2008 |
| CN | 101176805 | | | 5/2008 |
| CN | 201379072 | | | 1/2010 |
| CN | 202085723 | | | 12/2011 |
| CN | 103271447 | | | 9/2013 |
| CN | 203168033 | | | 9/2013 |
| CN | 203369386 | | | 1/2014 |
| CN | 104041940 | | | 9/2014 |
| CN | 105852218 | A | * | 8/2016 |
| DE | 10 2006 004 484 | | | 8/2007 |
| DE | 102006041042 | | | 3/2008 |
| DE | 10 2007 011 120 | | | 9/2008 |
| DE | 20 2009 010 400 | | | 11/2009 |
| EP | 0 295 122 | | | 12/1988 |
| EP | 0 430 566 | | | 6/1991 |
| EP | 0 503 767 | | | 9/1992 |
| EP | 0 845 220 | | | 6/1998 |
| EP | 1 618 803 | | | 1/2006 |
| EP | 1412829 | | | 2/2010 |
| EP | 2 316 286 | | | 5/2011 |
| EP | 2727619 | | | 5/2014 |
| GB | 2469850 | | | 11/2010 |
| JP | S 63127400 | U | | 8/1988 |

(56) References Cited

FOREIGN PATENT DOCUMENTS

| | | | |
|---|---|---|---|
| JP | 2010506954 | | 3/2010 |
| JP | 2011518567 | | 6/2011 |
| KR | 2013/0052119 | | 5/2013 |
| KR | 101552254 | | 9/2015 |
| RU | 2336001 | C2 | 10/2008 |
| WO | WO 94/06314 | | 3/1994 |
| WO | WO 1997/48293 | | 12/1997 |
| WO | WO 2003/034847 | | 5/2003 |
| WO | WO 2004/043175 | | 5/2004 |
| WO | WO 2004/080216 | | 9/2004 |
| WO | WO 2005/099494 | | 10/2005 |
| WO | WO 2007/078273 | | 7/2007 |
| WO | WO 2007/131449 | | 11/2007 |
| WO | WO 2009/105919 | | 9/2009 |
| WO | WO 2009/155734 | | 12/2009 |
| WO | WO 2010/003480 | | 1/2010 |
| WO | WO 2010/045670 | | 4/2010 |
| WO | WO 2010/073122 | | 7/2010 |
| WO | WO 2010/118644 | | 10/2010 |
| WO | WO 2010/140937 | | 12/2010 |
| WO | WO 2011/010334 | | 1/2011 |
| WO | WO 2011/117759 | | 9/2011 |
| WO | WO 2012/072762 | | 6/2012 |
| WO | WO 2012/100523 | | 8/2012 |
| WO | WO 2012/174677 | | 12/2012 |
| WO | WO 2013/089551 | | 6/2013 |
| WO | WO 2013/116558 | | 8/2013 |
| WO | WO2013/116572 | | 8/2013 |
| WO | WO 2013/120566 | | 8/2013 |
| WO | WO 2014/032276 | | 3/2014 |
| WO | WO 2014/110119 | | 7/2014 |
| WO | WO 2014/116974 | | 7/2014 |
| WO | WO 2015/046386 | | 4/2015 |
| WO | WO2015/079197 | | 6/2015 |
| WO | WO 2015/091258 | | 6/2015 |
| WO | WO 2015/101651 | | 7/2015 |
| WO | WO 2015/165812 | | 11/2015 |
| WO | WO 2015/179388 | | 11/2015 |
| WO | WO 2017/089939 | | 6/2017 |

OTHER PUBLICATIONS

Perfetti et al., Structural Study of Nicotine Salts, 1983, Vo. 12, No. 2, pp. 43-54.

R.J. Reynolds Tobacco Company; Chemical and Biological Studies on New Cigarette Prototypes that Heat Instead of Burn Tobacco, 1988.

* cited by examiner

ELECTRICALLY-POWERED AEROSOL DELIVERY SYSTEM

CROSS-REFERENCE TO RELATED APPLICATIONS

The present application is a continuation of U.S. patent application Ser. No. 14/282,768, filed May 20, 2014, the disclosure of which is incorporated herein by reference in its entirety.

BACKGROUND

Field of the Disclosure

The present disclosure relates to aerosol delivery devices and systems, such as smoking articles; and more particularly, to aerosol delivery devices and systems that utilize electrically-generated heat for the production of aerosol (e.g., smoking articles commonly referred to as electronic cigarettes). The aerosol delivery devices and systems may be configured to heat an aerosol precursor, which incorporates materials that may be, though not necessarily, made or derived from tobacco or otherwise incorporate tobacco, and which are capable of vaporizing to form an inhalable aerosol for human consumption.

Description of Related Art

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. No. 2013/0255702 to Griffith, Jr. et al.; and U.S. Pat. App. Pub. No. 2014/0096781 to Sears et al., which are incorporated herein by reference. See also, for example, the various types of smoking articles, aerosol delivery devices and electrically powered heat generating sources referenced by brand name and commercial source in U.S. patent application Ser. No. 14/170,838, filed Feb. 3, 2014, to Bless et al., which is incorporated herein by reference.

It would be desirable to provide an electrically-powered aerosol delivery system that is capable of allowing the user thereof to draw aerosol that is highly flavorful. It may also be desirable for the aerosol to be provided under pleasing or comfortable conditions upon being drawn into the mouth of the user.

SUMMARY OF THE DISCLOSURE

The present disclosure relates to aerosol delivery systems. Such systems have the ability to generate aerosol as a result of heat generated by electrical power sources, and to deliver aerosol that is intended to be drawn into the mouth of a user. Of particular interest are aerosol delivery systems that provide components of tobacco in an aerosol form, such as is provided to smokers by devices commonly known or characterized as electronic cigarettes. As used herein, the term "aerosol" is meant to include vapors, gases, aerosols, and/or particulate matter of a form or type suitable for human inhalation, whether visible or not, and whether or not of a form that might be considered to be "smoke-like."

The above and other needs are met by aspects of the present disclosure which, in one aspect, provides an aerosol delivery system. Such an aerosol delivery system may comprise a control body portion, wherein the control body portion includes a first elongate tubular member having opposed ends, and a power source disposed therein. A cartridge body portion includes a second tubular member having opposed first and second ends. One of the first and second ends of the cartridge body portion is removably engaged with one of the opposed ends of the control body portion. The cartridge body portion further comprises a first aerosol generation arrangement disposed within the second tubular member, and configured to operably engage the power source upon engagement between the one of the opposed ends of the control body portion and the one of the first and second ends of the cartridge body portion. The other of the first and second ends of the cartridge body portion is further configured as a mouth-engaging end. The cartridge body portion further includes a second aerosol generation arrangement within the second tubular member disposed between the first aerosol generation arrangement and the mouth-engaging end. In some aspects, the second aerosol generation arrangement may further include one or more aerosol generation elements, wherein the one or more (at least one) aerosol generation elements may be selected from the group consisting of granules, pellets, beads, discrete small units, carbon pieces, extruded carbon pieces, ceramic beads, marumarized tobacco pieces, extruded or compressed cylindrical or spherical elements, milled tobacco lamina, fillers, flavors, visible aerosol forming materials, binders, ovoid elements, irregularly shaped elements, shredded pieces, flakes, elements including tobacco, elements including a visible aerosol-forming material, adsorbent objects, absorbent objects, capsules, microcapsules, a honeycomb monolith, a single porous structure, and combinations thereof.

Another aspect of the present disclosure provides a method of forming an aerosol delivery system. Such a method may comprise removably engaging one end of a first elongate tubular member with a first end of a second tubular member, wherein the first elongate tubular member is configured as a control body portion and having a power source disposed therein, and the second tubular member is configured as a cartridge body portion and having a first aerosol generation arrangement disposed therein. The first aerosol generation arrangement is configured to operably engage the power source upon engagement between the one end of the control body portion and the first end of the cartridge body portion. The method may also comprise inserting a second aerosol generation arrangement within the second tubular member of the cartridge body portion, between the first aerosol generation arrangement and a second end of the second tubular member, wherein the second end is opposed to the first end and is configured as a mouth-engaging end. In some instances, inserting the second aerosol generation arrangement within the second tubular member may further comprise inserting one or more aerosol generation elements, at least partially forming the second aerosol generation arrangement, into the second tubular member, wherein the one or more (at least one) aerosol generation elements is selected from the group consisting of granules, pellets, beads, discrete small units, carbon pieces, extruded carbon pieces, ceramic beads, marumarized tobacco pieces, extruded or compressed cylindrical or spherical elements, milled tobacco lamina, fillers, flavors, visible aerosol forming materials, binders, ovoid elements, irregularly shaped elements, shredded pieces, flakes, elements including tobacco, elements including a visible aerosol-forming material, adsorbent objects, absorbent objects, capsules, microcapsules, a honeycomb monolith, a single porous structure, and combinations thereof.

These and other features, aspects, and advantages of the disclosure will be apparent from a reading of the following detailed description together with the accompanying drawings, which are briefly described below. The present disclosure includes any combination of two, three, four, or more of the above-noted aspects as well as combinations of any two, three, four, or more features or elements set forth in this disclosure, regardless of whether such features or elements are expressly combined in a specific embodiment description herein. This disclosure is intended to be read holistically such that any separable features or elements of the present disclosure, in any of its various aspects and embodiments, should be viewed as intended to be combinable unless the context clearly dictates otherwise.

BRIEF DESCRIPTION OF THE DRAWINGS

Figure 1:
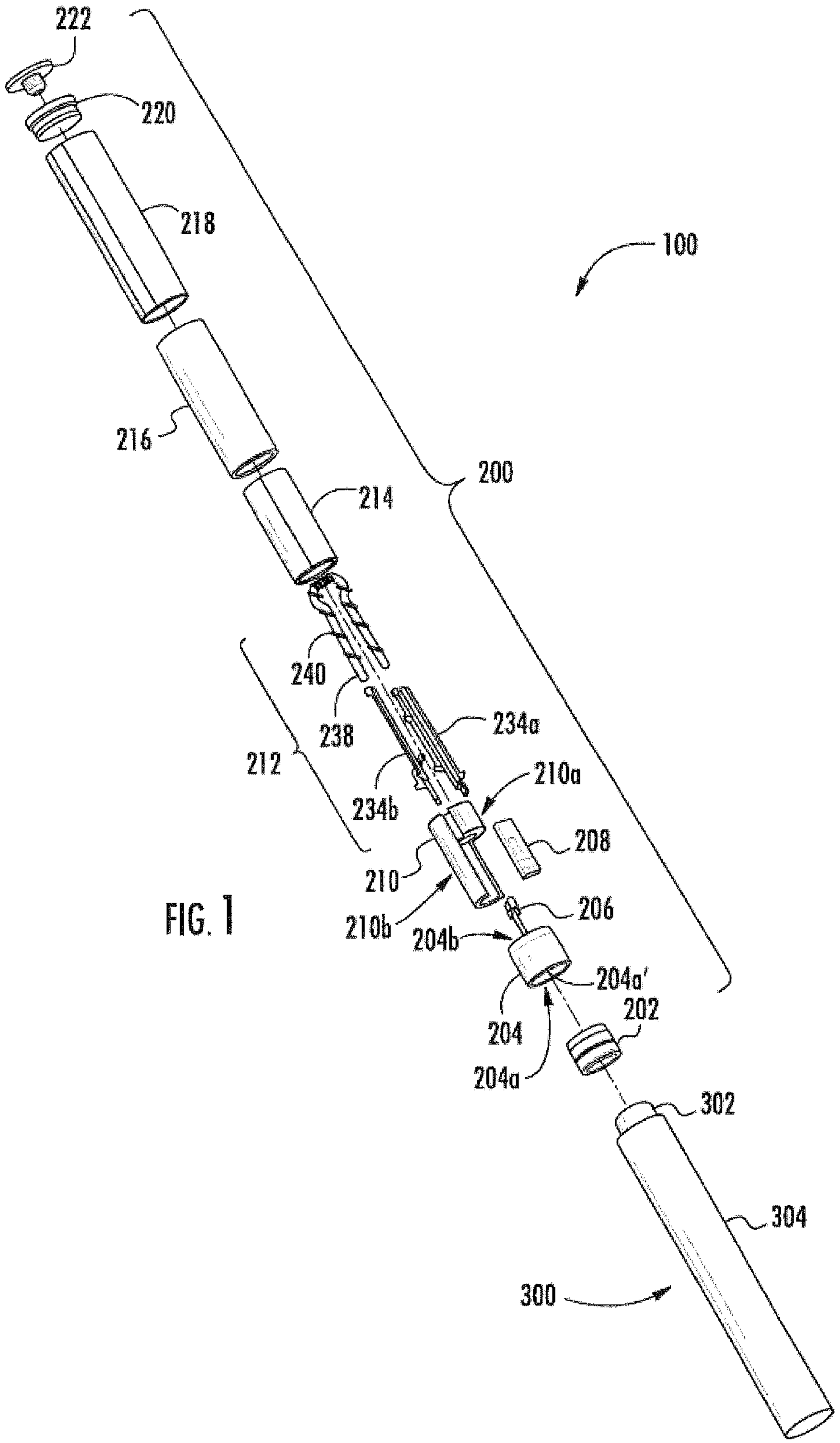
Figure 2:
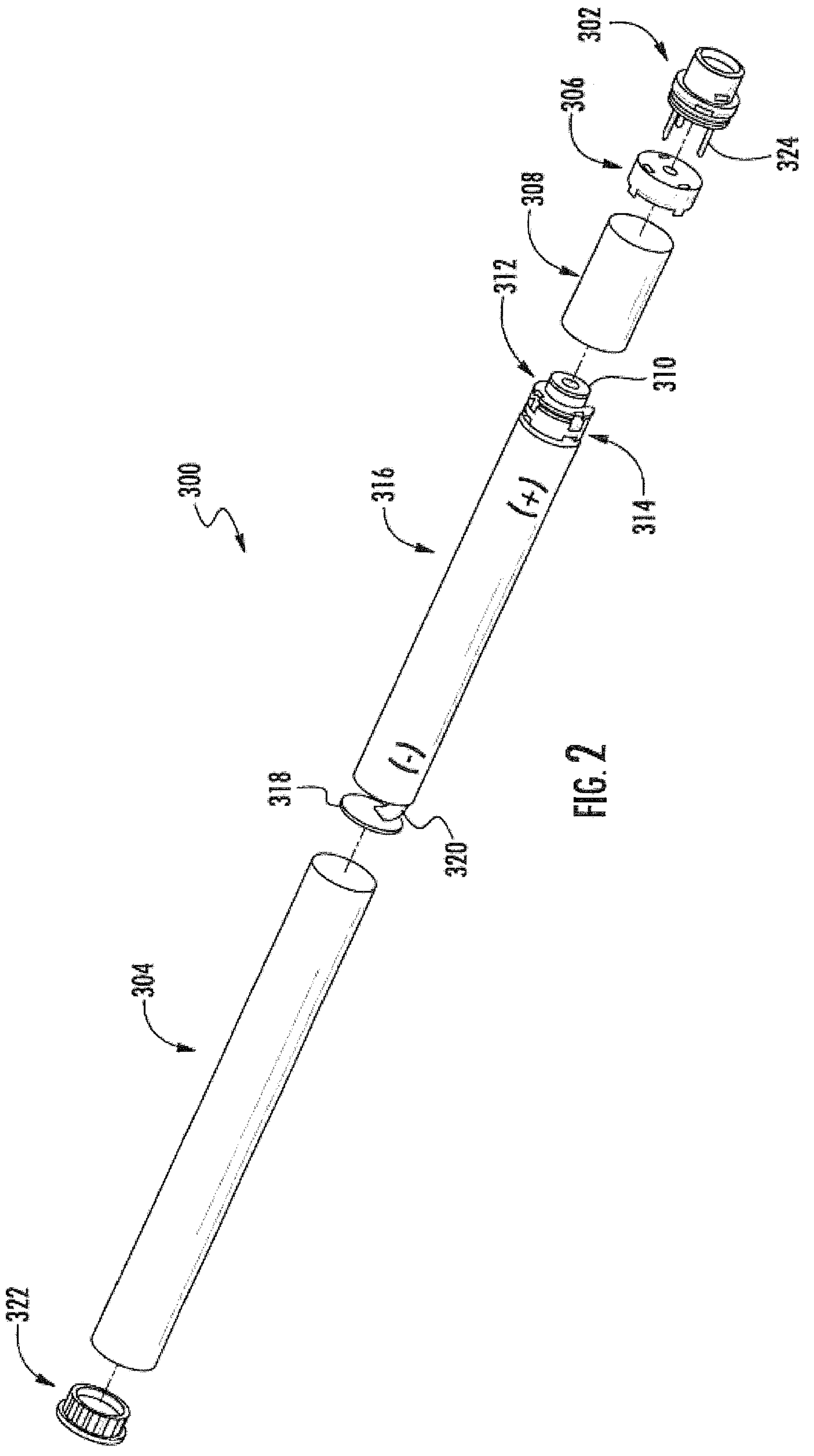
Figure 3:
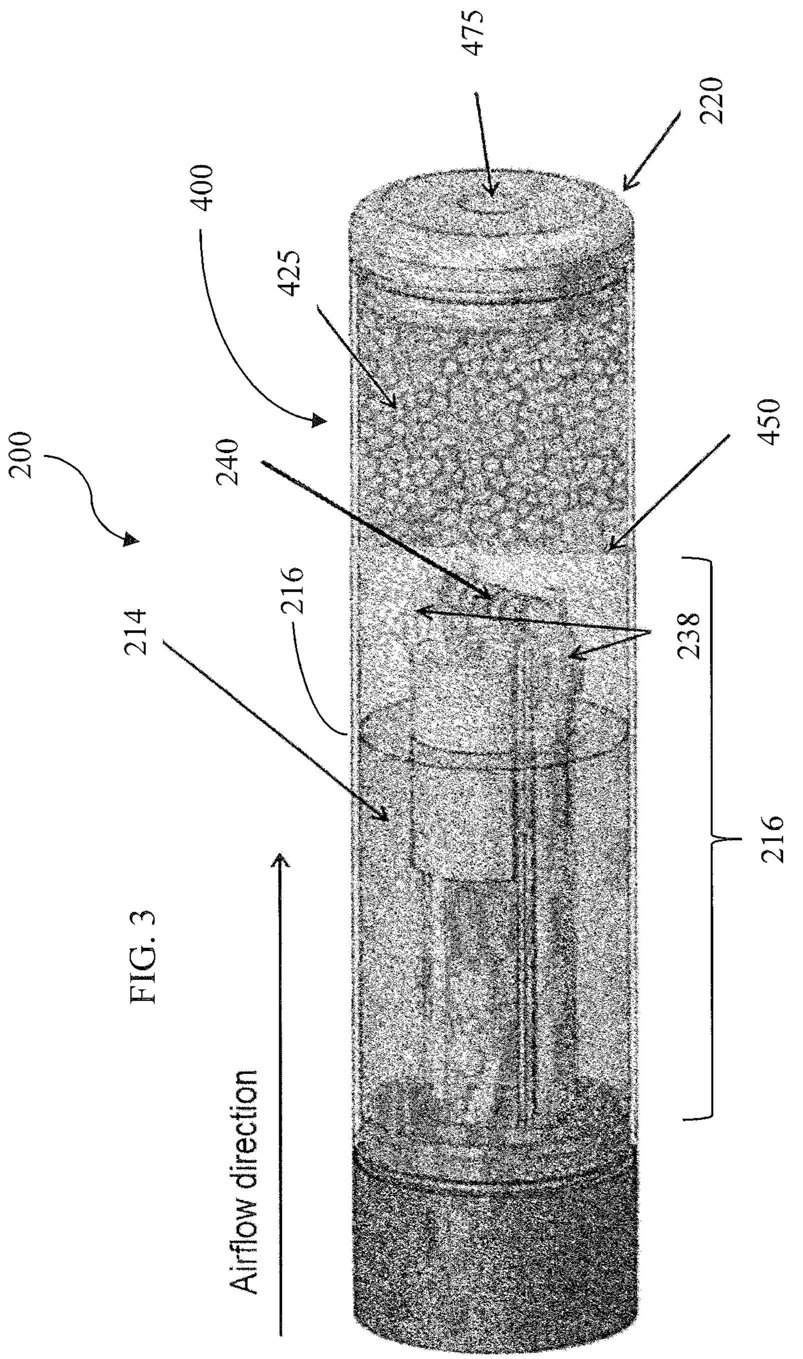
Figure 4:
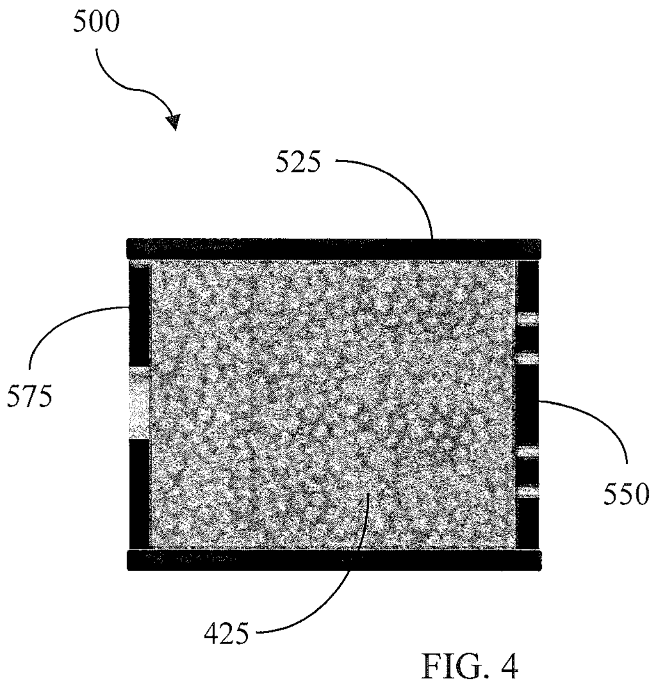
Figure 5:
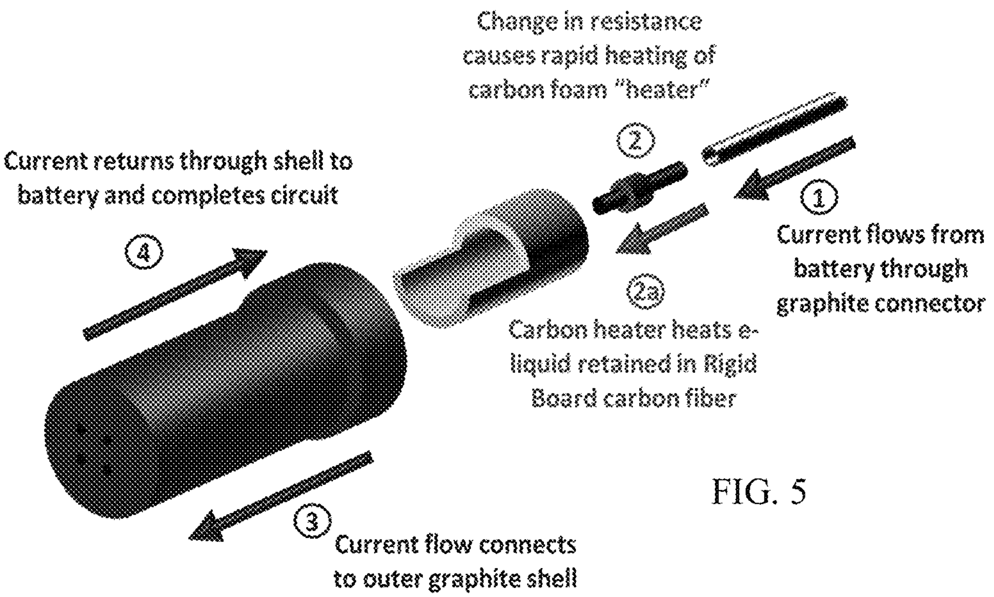
Figure 6A:
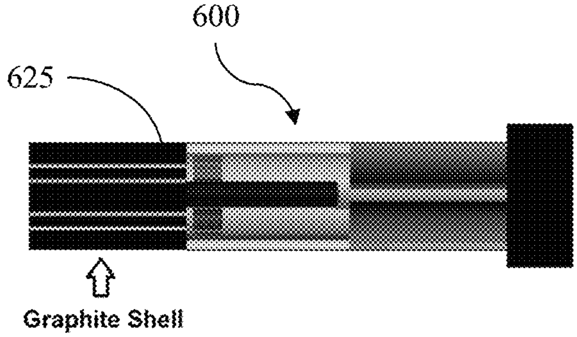
Figure 6B:
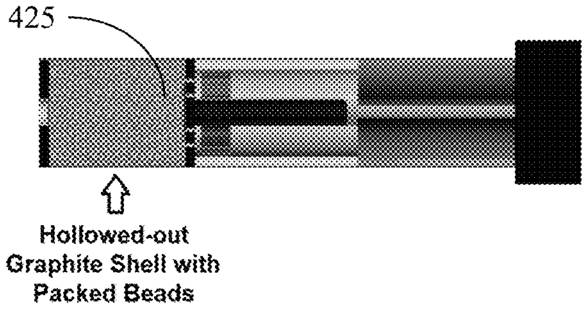

Having thus described the disclosure in general terms, reference will now be made to the accompanying drawings, which are not necessarily drawn to scale, and wherein:

FIG. 1 schematically illustrates an aerosol delivery device comprising a cartridge body and a control body, the cartridge body being illustrated in an exploded configuration and the control body being illustrated in an assembled configuration according to an example aspect of the present disclosure;

FIG. 2 schematically illustrates the control body of FIG. 1 in an exploded configuration according to an example aspect of the present disclosure;

FIG. 3 schematically illustrates the cartridge body of FIG. 1 implementing an additional aerosol generation arrangement, including one or more aerosol-generating elements, according to one aspect of the present disclosure;

FIG. 4 schematically illustrates the additional aerosol generation arrangement of FIG. 3, configured as a cartridge including one or more aerosol-generating elements, according to another aspect of the present disclosure;

FIG. 5 schematically illustrates an exploded view of an alternate carbon-based cartridge body according to an example aspect of the present disclosure;

FIG. 6A schematically illustrates an assembled view of the carbon-based cartridge body of FIG. 5, according to an example aspect of the present disclosure; and FIG. 6B schematically illustrates an assembled view of the carbon-based cartridge body, implementing an additional aerosol generation arrangement, including one or more aerosol-generating elements, according to one aspect of the present disclosure.

DETAILED DESCRIPTION OF THE PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

As described hereinafter, aspects of the present disclosure relate to aerosol delivery systems. Aerosol delivery systems according to the present disclosure use electrical energy to heat a material (preferably without combusting the material to any significant degree) to form an inhalable substance; and components of such systems have the form of articles most preferably sufficiently compact for such systems to be considered hand-held devices. That is, use of components of preferred aerosol delivery systems does not result in the production of smoke in the sense that aerosol results principally from by-products of combustion or pyrolysis of tobacco, but rather, use of those preferred systems results in the production of vapors (including vapors within aerosols that can be considered to be visible/not visible aerosols that might be considered to be described as smoke-like), resulting from volatilization or vaporization of certain components incorporated therein. In preferred aspects, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe that are provided by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery systems of the present disclosure also can be characterized as being suitable vapor-producing articles, aerosol-producing articles, or medicament delivery articles. Thus, such articles, systems, or devices can be adapted so as to provide one or more substances (e.g., flavors, pharmaceutical active ingredients, peptides, protein fragments, and/or protein coats) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases, aerosols, and/or particulate matter of a form or type suitable for human inhalation, whether or not visible, and whether or not of a form that might be considered to be smoke-like.

Aerosol delivery systems of the present disclosure most preferably comprise some combination of a power source (i.e., an electrical power source), at least one control component (e.g., means for actuating, controlling, regulating and/or ceasing power supplied for heat generation, such as by controlling electrical current flow from an electrical power release unit to other components of the aerosol generating arrangement), a heater or heat generation component (e.g., an electrical resistance heating element and related components commonly referred to as providing an "atomizer"), and an aerosol precursor composition (e.g., a composition that commonly is a liquid capable of yielding an aerosol upon application of sufficient heat, such as ingredients commonly referred to as "smoke juice," "e-liquid" and "e-juice"), and a mouth end region, mouth-engaging end, or tip for allowing draw upon the aerosol delivery system for aerosol inhalation (e.g., a defined air flow path through the aerosol generation arrangement such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in background art section of the present disclosure.

In some aspects, the use of aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, or for selected durations of time, etc.

One such example of an aerosol delivery system 100 is illustrated in FIG. 1. In particular, FIG. 1 illustrates a partially exploded view of an aerosol delivery system 100 including a cartridge body 200 and a control body 300 (otherwise referred to herein as "cartridge body portion" and "control body portion," respectively). The cartridge body 200 and the control body 300 can be permanently or detachably aligned, or removably engaged, in a functioning relationship. Various mechanisms may be used to connect the cartridge body 200 to the control body 300 to result in a threaded engagement, a press-fit engagement, an interference fit, a magnetic engagement, or the like. The aerosol delivery system 100 may be substantially rod-like, substantially tubular shaped, or substantially cylindrically shaped in some embodiments, when the cartridge body 200 and the control body 300 are in an assembled configuration. One skilled in the art will also appreciate that, in some instances and though not described in detail herein, the cartridge body 200 and the control body 300 forming the aerosol delivery system 100 may be configured in a single-piece, non-detachable form and may incorporate the components, aspects, and features associated with and disclosed in the present disclosure.

In some instances, one or both of the cartridge body 200 and the control body 300 may be referred to as being disposable (i.e., the single piece, non-detachable form previously disclosed) or as being reusable. For example, a reusable control body 300 may have a replaceable battery or a rechargeable battery and thus may be combined with any type of recharging technology, including connection to a typical alternating current electrical outlet, connection to a car charger (i.e., cigarette lighter receptacle), and connection to a computer, such as through a universal serial bus (USB) cable. In general, an aerosol delivery system of the type disclosed herein incorporates a battery or other electrical power source to provide current flow sufficient to provide various functionalities to the article, such as powering of a heater or heating element, powering of control systems, powering of indicators, and the like. The power source can take on various embodiments. Preferably, the power source is able to deliver sufficient power to rapidly heat the heating element to provide for aerosol formation and power the article through use for the desired duration of time. The power source preferably is sized to fit conveniently within the aerosol delivery device/system so that the aerosol delivery device/system can be easily handled; and additionally, a preferred power source is of a sufficiently light weight to not detract from a desirable smoking experience. Further, in some instances, the cartridge body 200 may comprise a single-use cartridge (i.e., disposable), as disclosed, for example, in U.S. Pat. App. Pub. No. 2014/0060555 to Chang et al., which is incorporated herein by reference in its entirety.

FIG. 2 illustrates an exploded view of the control body 300 of the aerosol delivery system 100 according to another example. As illustrated, the control body 300 may comprise a coupler 302, an outer body 304, a sealing member 306, an adhesive member 308 (e.g., KAPTON® tape), a flow sensor 310 (e.g., a puff sensor or pressure switch), a control component 312, a spacer 314, an electrical power source 316 (e.g., a battery, which may be rechargeable), a circuit board with an indicator 318 (e.g., a light emitting diode (LED)), a connector circuit 320, and an end cap 322. Examples of electrical power sources are described in U.S. Pat. App. Pub. No. 2010/0028766 by Peckerar et al., the disclosure of which is incorporated herein by reference in its entirety.

With respect to the flow sensor 310, representative current regulating components and other current controlling components including various microcontrollers, sensors, and switches for aerosol delivery devices/systems are described, for example, in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al. and U.S. Pat. No. 8,205,622 to Pan; U.S. Pat. Pub. No. 2009/0230117 to Fernando et al. and U.S. Pat. Pub. No. 2014/0060554 to Collett et al.; and U.S. patent application Ser. No. 13/837,542, filed Mar. 15, 2013, to Ampolini et al. and U.S. patent application Ser. No. 14/209,191, filed Mar. 13, 2014, to Henry et al., which are incorporated herein by reference.

In some instances, the indicator 318 may comprise one or more light emitting diodes. The indicator 318 can be in communication with the control component 312 through the connector circuit 320 and illuminate, for example, during a user drawing on a cartridge body 200 coupled to the coupler 302, as detected by the flow sensor 310. The end cap 322 may be adapted to make visible the illumination provided thereunder by the indicator 318. Accordingly, the indicator 318 may illuminate during use of the aerosol delivery system 100 to simulate the lit end of a smoking article. However, in other instances, the indicator 318 can be provided in varying numbers and can take on different shapes and can even be an opening in the outer body (such as for release of sound when such indicators are present). Additional representative types of components that yield visual cues or indicators, such as light emitting diode (LED) components, and the configurations and uses thereof, are described in U.S. Pat. No. 5,154,192 to Sprinkel et al.; U.S. Pat. No. 8,499,766 to Newton and U.S. Pat. No. 8,539,959 to Scatterday; and U.S. patent application Ser. No. 14/173,266, filed Feb. 5, 2014, to Sears et al.; which are incorporated herein by reference.

Still further features, controls or components that can be incorporated into aerosol delivery devices and systems of the present disclosure are described in U.S. Pat. No. 5,967,148 to Harris et al.; U.S. Pat. No. 5,934,289 to Watkins et al.; U.S. Pat. No. 5,954,979 to Counts et al.; U.S. Pat. No. 6,040,560 to Fleischhauer et al.; U.S. Pat. No. 7,726,320 to Robinson et al.; U.S. Pat. No. 8,365,742 to Hon; U.S. Pat. Nos. 8,402,976 and 8,689,804 to Fernando et al.; U.S. Pat. App. Pub. No. 2013/0192623 to Tucker et al.; U.S. Pat. App. Pub. No. 2013/0298905 to Leven et al.; U.S. Pat. App. Pub. No. 2013/0180553 to Kim et al. and U.S. Pat. App. Pub. No. 2014/0000638 to Sebastian et al.; and U.S. patent application Ser. No. 13/840,264, filed Mar. 15, 2013, to Novak et al. and U.S. patent application Ser. No. 13/841,233, filed Mar. 15, 2013, to DePiano et al.; which are incorporated herein by reference in their entireties.

Returning to FIG. 1, the cartridge body 200 is illustrated in an exploded configuration. As illustrated, the cartridge body 200 may comprise a base shipping plug 202, a base 204, a control component terminal 206, an electronic control component 208, a flow tube 210, an atomizer 212, a reservoir substrate 214, an outer body 216, a label 218, a mouthpiece 220, and a mouthpiece shipping plug 222 according to an example embodiment of the present disclosure. The base 204 may be coupled to a first end of the outer body 216 and the mouthpiece 220 may be coupled to an opposing second end of the outer body 216 to enclose the remaining components of the cartridge body 200 therein. The base 204 may be configured to removably engage the coupler 302 of the control body 300. In some instances, the base 204 may comprise anti-rotation features that substantially prevent relative rotation between the cartridge body and the control body as disclosed in U.S. patent application Ser. No. 13/840,264, filed Mar. 15, 2013, which is incorporated herein by reference in its entirety. Various representative coupling mechanisms for upstream and downstream components of electronic cigarettes have been set forth in the patent literature and have been employed for the production of commercially available electronic cigarettes. For example, representative types of coupling mechanisms and components for electronic cigarettes are described in U.S. patent application Ser. No. 13/840,264, filed Mar. 15, 2013, to Novak et al. and U.S. patent application Ser. No. 14/170,838, filed Feb. 3, 2014, to Bless et al.; which are incorporated herein by reference.

The base shipping plug 202 may be configured to engage and protect the base 204 prior to use of the cartridge body 200. Similarly, the mouthpiece shipping plug 222 may be configured to engage and protect the mouthpiece 220 prior to use of the cartridge body 200. The control component terminal 206, the electronic control component 208, the flow tube 210, the atomizer 212, and the reservoir substrate 214 (engaging the aerosol precursor composition or substance) may be retained within the outer body 216. The label 218 may at least partially surround the outer body 216 and include information such as a product identifier thereon.

Alignment of the components within either or both of the control body and the cartridge body of the aerosol delivery device/system can vary. In particular aspects, the aerosol precursor composition can be located near one end of the overall article (e.g., within a cartridge body, which in certain circumstances can be replaceable and disposable), which may be configured to be positioned in relatively closer proximity to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (and/or one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof. Additionally, the selection of various aerosol delivery device components can be appreciated upon consideration of the commercially available electronic aerosol delivery devices, such as those representative products listed above in the present disclosure.

The atomizer (i.e., an aerosol generation arrangement) 212 may comprise a first heating terminal **234*a* and a second heating terminal 234*b*, a liquid transport element 238 and a heating element 240. In this regard, the reservoir and/or reservoir substrate 214** may be configured to hold an aerosol precursor composition. The aerosol precursor composition, also referred to as a vapor precursor composition, may comprise a variety of components in different aspects. Such components may include, by way of example, any of a polyhydric alcohol (e.g., glycerin, propylene glycol, or a mixture thereof), nicotine, tobacco, tobacco extract, water, flavorants, and combinations thereof.

The aerosol precursor, or vapor precursor composition, can vary. Most preferably, the aerosol precursor composition is comprised of a combination or mixture of various ingredients or components. The selection of the particular aerosol precursor components, and the relative amounts of those components used, may be altered in order to control the overall chemical composition of the mainstream aerosol produced by the aerosol generation arrangement(s). Of particular interest are aerosol precursor compositions that can be characterized as being generally liquid in nature. For example, representative generally liquid aerosol precursor compositions may have the form of liquid solutions, viscous gels, mixtures of miscible components, or liquids incorporating suspended or dispersed components. Typical aerosol precursor compositions are capable of being vaporized upon exposure to heat under those conditions that are experienced during use of the aerosol generation arrangement(s) that are characteristic of the present disclosure; and hence are capable of yielding vapors and aerosols that are capable of being inhaled.

For aerosol delivery systems that are characterized as electronic cigarettes, the aerosol precursor composition most preferably incorporates tobacco or components derived from tobacco. In one regard, the tobacco may be provided as parts or pieces of tobacco, such as finely ground, milled or powdered tobacco lamina. In another regard, the tobacco may be provided in the form of an extract, such as a spray dried extract that incorporates many of the water soluble components of tobacco. Alternatively, tobacco extracts may have the form of relatively high nicotine content extracts, which extracts also incorporate minor amounts of other extracted components derived from tobacco. In another regard, components derived from tobacco may be provided in a relatively pure form, such as certain flavoring agents that are derived from tobacco. In one regard, a component that is derived from tobacco, and that may be employed in a highly purified or essentially pure form, is nicotine (e.g., pharmaceutical grade nicotine).

The aerosol precursor composition may also incorporate so-called "aerosol forming materials." Such materials may, in some instances, have the ability to yield visible (or not visible) aerosols when vaporized upon exposure to heat under those conditions experienced during normal use of aerosol generation arrangement(s) that are characteristic of the present disclosure. Such aerosol forming materials include various polyols or polyhydric alcohols (e.g., glycerin, propylene glycol, and mixtures thereof). Aspects of the present disclosure also incorporate aerosol precursor components that can be characterized as water, saline, moisture or aqueous liquid. During conditions of normal use of certain aerosol generation arrangement(s), the water incorporated within those aerosol generation arrangement(s) can vaporize to yield a component of the generated aerosol. As such, for purposes of the current disclosure, water that is present within the aerosol precursor composition may be considered to be an aerosol forming material.

It is possible to employ a wide variety of optional flavoring agents or materials that alter the sensory character or nature of the drawn mainstream aerosol generated by the aerosol delivery system of the present disclosure. For example, such optional flavoring agents may be used within the aerosol precursor composition or substance to alter the flavor, aroma and organoleptic properties of the aerosol. Certain flavoring agents may be provided from sources other than tobacco. Exemplary flavoring agents may be natural or artificial in nature, and may be employed as concentrates or flavor packages.

Exemplary flavoring agents include vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar and pipe tobaccos. Syrups, such as high fructose corn syrup, also can be employed. Certain flavoring agents may be incorporated within aerosol forming materials prior to formulation of a final aerosol precursor mixture (e.g., certain water soluble flavoring agents can be incorporated within water, menthol can be incorporated within propylene glycol, and certain complex flavor packages can be incorporated within propylene glycol). However, in some aspects of the present disclosure, the aerosol precursor composition is free of any flavorants, flavor characteristics or additives.

Aerosol precursor compositions also may include ingredients that exhibit acidic or basic characteristics (e.g., organic acids, ammonium salts or organic amines). For example, certain organic acids (e.g., levulinic acid, succinic acid, lactic acid, and pyruvic acid) may be included in an aerosol precursor formulation incorporating nicotine, preferably in amounts up to being equimolar (based on total organic acid content) with the nicotine. For example, the aerosol precursor may include about 0.1 to about 0.5 moles of levulinic acid per one mole of nicotine, about 0.1 to about 0.5 moles of succinic acid per one mole of nicotine, about 0.1 to about 0.5 moles of lactic acid per one mole of nicotine, about 0.1 to about 0.5 moles of pyruvic acid per one mole of nicotine, or various permutations and combinations thereof, up to a concentration wherein the total amount of organic acid present is equimolar to the total amount of nicotine present in the aerosol precursor composition. However, in some aspects of the present disclosure, the aerosol precursor composition is free of any acidic (or basic) characteristics or additives.

As one non-limiting example, a representative aerosol precursor composition or substance can include glycerin, water, saline, and nicotine, and combinations or mixtures of any or all of those components. For example, in one instance, a representative aerosol precursor composition may include (on a weight basis) about 70% to about 100% glycerin, and often about 80% to about 90% glycerin; about 5% to about 25% water, often about 10% to about 20% water; and about 0.1% to about 5% nicotine, often about 2% to about 3% nicotine. In one particular non-limiting example, a representative aerosol precursor composition may include about 84% glycerin, about 14% water, and about 2% nicotine. The representative aerosol precursor composition may also include propylene glycol, optional flavoring agents or other additives in varying amounts on a weight basis. In some instances, the aerosol precursor composition may comprise up to about 100% by weight of any of glycerin, water, and saline, as necessary or desired.

Representative types of aerosol precursor components and formulations also are set forth and characterized in U.S. Pat. No. 7,217,320 to Robinson et al. and U.S. Pat. Pub. No. 2013/0008457 to Zheng et al.; U.S. Pat. Pub. No. 2013/0213417 to Chong et al. and U.S. Pat. Pub. No. 2014/0060554 to Collett et al., the disclosures of which are incorporated herein by reference. Other aerosol precursors that may be employed include the aerosol precursors that have been incorporated in the VUSE® product by R. J. Reynolds Vapor Company, the BLU™ product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

The amount of aerosol precursor that is incorporated within the aerosol delivery system is such that the aerosol generation arrangement(s) provide acceptable sensory and desirable performance characteristics. For example, it is highly preferred that sufficient amounts of aerosol forming material (e.g., glycerin and/or propylene glycol), be employed in order to provide for the generation of a mainstream aerosol (visible or not visible) that in many regards resembles the appearance of tobacco smoke. The amount of the aerosol precursor composition within the aerosol generation arrangement(s) may be dependent upon factors such as the number of puffs desired per aerosol generation arrangement. Typically, the amount of the aerosol precursor composition incorporated within the aerosol delivery system, and particularly within the aerosol generation arrangement(s), is less than about 2 g, generally less than about 1.5 g, often less than about 1 g and frequently less than about 0.5 g.

The reservoir substrate 214 may comprise a plurality of layers of nonwoven fibers formed into the shape of a tube encircling the interior of the outer body 216 of the cartridge body 200. Thus, liquid components, for example, can be sorptively retained by the reservoir substrate 214. The reservoir substrate 214 is in fluid connection with the liquid transport element 238. The liquid transport element 238 may be configured to transport liquid (i.e., the aerosol precursor composition) from the reservoir substrate 214 to the heating element 240 via capillary action. Representative types of substrates, reservoirs or other components for supporting the aerosol precursor composition are described in U.S. Pat. No. 8,528,569 to Newton; and U.S. patent application Ser. No. 13/802,950; filed Mar. 15, 2013, to Chapman et al.; U.S. patent application Ser. No. 14/011,192; filed Aug. 28, 2013, to Davis et al. and U.S. patent application Ser. No. 14/170, 838; filed Feb. 3, 2014, to Bless et al.; which are incorporated herein by reference. Additionally, various wicking materials, and the configuration and operation of those wicking materials within certain types of electronic cigarettes, are set forth in U.S. patent application Ser. No. 13/754,324; filed Jan. 30, 2013, to Sears et al.; which is incorporated herein by reference.

As illustrated, the liquid transport element 238 may be in direct contact with the heating element 240. As further illustrated in FIG. 1, the heating element 240 may comprise a wire defining a plurality of coils wound about the liquid transport element 238. In some instances, the heating element 240 may be formed by winding the wire about the liquid transport element 238 as described in U.S. patent application Ser. No. 13/708,381; filed Dec. 7, 2012, which is incorporated herein by reference in its entirety. Further, in some instances, the wire may define variable coil spacing, as described in U.S. patent application Ser. No. 13/827,994; filed Mar. 14, 2013, which is incorporated herein by reference in its entirety. Various materials configured to produce heat when an electrical current is applied thereto may be employed to form the heating element 240. Example materials from which the wire coil may be formed include Kanthal (FeCrAl), Nichrome, molybdenum disilicide ($MoSi_2$), molybdenum silicide (MoSi), molybdenum disilicide doped with aluminum ($Mo(Si,Al)_2$), graphite and graphite-based materials; and ceramic (e.g., a positive or negative temperature coefficient ceramic).

However, various other methods may be employed to form the heating element 240, and various other aspects of heating elements may be employed in the atomizer 212. For example, a stamped heating element may be employed in the atomizer, as described in U.S. patent application Ser. No. 13/842,125; filed Mar. 15, 2013, which is incorporated herein by reference in its entirety. Further to the above, additional representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties. Further, chemical heating may be employed in other aspects. A variety of heater components may also be used in particular aspects of the present aerosol delivery device/system. In various instances, one or more microheaters or similar solid state heating elements may be used. Exemplary microheaters that may be utilized are further described herein. Further microheaters and atomizers incorporating microheaters suitable for use in the presently disclosed devices/systems are described in U.S. Pat. App. Pub. No. 2014/0060554 to Collett et al., which is incorporated herein by reference in its entirety.

The first heating terminal 234*a* and the second heating terminal 234*b* (e.g., positive and negative terminals) at the opposing ends of the heating element 240 are configured to form an electrical connection (which may be a removable or detachable connection) with the control body 300 when the cartridge body 200 is connected thereto. Further, when the control body 300 is coupled to the cartridge body 200, the electronic control component 208 may form an electrical connection with the control body 300 through the control component terminal 206. The control body 300 may thus employ the electronic control component 208 to determine whether the cartridge 200 is genuine and/or perform other functions. Further, various examples of electronic control components and functions performed thereby are described in U.S. Pat. App. Pub. No. 2014/0096781 to Sears et al., which is incorporated herein by reference in its entirety.

During use, a user may draw on the mouthpiece or mouth-engaging end 220 of the cartridge body 200 of the aerosol delivery system 100. This may pull air through an opening in the control body 300 and/or in the cartridge body 200. For example, in one instance, an opening may be defined between the coupler 302 and the outer body 304 of the control body 300, as described in U.S. patent application Ser. No. 13/841,233; Filed Mar. 15, 2013, which is incorporated herein by reference in its entirety. However, the flow of air may be received through other parts of the aerosol delivery device/system 100 in other aspects. As noted above, in some aspects the cartridge body 200 may include the flow tube 210. The flow tube 210 may be configured to direct the flow of air received from the control body 300 to the heating element 240 of the atomizer 212.

A sensor in the aerosol delivery device/system 100 (e.g., a puff or flow sensor in the control body 300) may sense the puff. More generally, a sensor or detector may be implemented to control of supply of electric power to the heating element 240 when aerosol generation is desired (e.g., upon draw during use). As such, for example, there is provided a manner or method for turning off the power supply to the heating element 240 when the aerosol generation is not desired during use, and for turning on the power supply to actuate or trigger the generation of heat by the heating element 240 during draw. Additional representative types of sensing or detection mechanisms, structure and configuration thereof, components thereof, and general methods of operation thereof, are described in U.S. Pat. No. 5,261,424 to Sprinkel, Jr.; U.S. Pat. No. 5,372,148 to McCafferty et al.; and PCT WO 2010/003480 by Flick; which are incorporated herein by reference. When the puff is sensed, the control body 300 may direct current to the heating element 240 through a circuit including the first heating terminal 234*a* and the second heating terminal 234*b*. Accordingly, the heating element 240 may vaporize the aerosol precursor composition directed to an aerosolization zone from the reservoir substrate 214 by the liquid transport element 238. Thus, the mouthpiece 220 may allow passage of air and entrained vapor (i.e., the components of the aerosol precursor composition in an inhalable form, for example, as an aerosol) from the cartridge body 200 to a consumer drawing thereon. Various other details with respect to the components that may be included in the cartridge body 200, are provided, for example, in U.S. patent application Ser. No. 13/840,264; filed Mar. 15, 2013, which is incorporated herein by reference in its entirety.

Various components of an aerosol delivery device/system can be chosen from components described in the art and commercially available. Reference is made for example to the reservoir and heater system for controllable delivery of multiple aerosolizable materials in an electronic smoking article disclosed in U.S. Pat. App. Pub. No. 2014/0000638 to Sebastian et al., which is incorporated herein by reference in its entirety. Note further that portions of the cartridge body 200 illustrated in FIG. 1 are optional. In this regard, by way of example, the cartridge body 200 may not necessarily include the flow tube 210, the control component terminal 206, and/or the electronic control component 208, in some instances.

One particular aspect of the present disclosure is illustrated, for example, in FIG. 3. In such instances, the cartridge body 200 may further incorporate a second aerosol generation arrangement 400 (the atomizer 212 being considered "a first aerosol generation arrangement") disposed in the outer body 216, longitudinally between the atomizer 212 and the mouthpiece or mouth-engaging end 220 of the cartridge body 200. In some aspects, the second aerosol generation arrangement 400 is generally porous or otherwise configured to allow the passage of air therethrough. In some particular instances, the second aerosol generation arrangement 400 may include one or more aerosol-generating elements 425 that may be comprised of at least one or a plurality of pellets or beads or other appropriate elements or combinations thereof. In some instances, the at least one or a plurality of pellets or beads or other appropriate elements or combinations thereof forming the aerosol-generating element(s) 425 may be coaxially circumscribed by a generally tubular-shaped heat conductive member (not shown), if necessary, and/or circumscribed or otherwise jacketed by insulation (e.g., a non-woven mat or layer of glass filaments or fibers), or other suitable material (not shown).

The overall configuration of the second aerosol generation arrangement 400 within the cartridge body 200 of the aerosol delivery device/system 100 can be considered to be generally cylindrical in nature. Representative preferred beads or other objects may be produced from a formulation that incorporates tobacco, components of tobacco and/or materials that are otherwise derived from tobacco. The beads most preferably incorporate flavors and a visible or non-visible aerosol forming material (e.g., glycerin or other material that generates a visible vapor that resembles smoke). That is, components of the beads are preferably configured to act as substrate components for volatile flavors, vapor forming materials, moisture or other liquid(s), and/or aerosol forming materials that are carried thereby. In some aspects, the aerosol-generating element(s) 425 may include or otherwise comprise or be configured as, for example, marumarized tobacco beads of varying shapes and sizes, a monolith of bonded (e.g., sintered) beads; a porous monolith; a single porous structure; a honeycomb monolith; a single piece of a porous material; beads of extruded tobacco; beads of porous material containing tobacco extract (e.g., calcium carbonate, ceramic, or the like); reconstituted tobacco shreds; expanded tobacco shreds; extruded rods of various materials (including hollow cylinders and slotted rods) containing tobacco flavors; shavings, granules, capsules, and/or microcapsules of various materials containing tobacco flavors or other substances, whether in a liquid or other form; and treatments or combinations thereof.

In general, as used herein, the terms "pellets" and "beads" are meant to include beads, pellets, or other discrete small units or pieces of that may include (in addition to those otherwise disclosed herein), for example, carbon pieces, extruded carbon pieces cut into pellets, ceramic beads, marumarized tobacco pieces, and the like, or combinations thereof. For example, granules, pellets or beads can be generally cylindrical or spherical extruded or compressed granules, pellets or beads of comprised of a moistened mixture or slurry of milled tobacco lamina, fillers (e.g., granular calcium carbonate), flavors, visible aerosol forming materials and binders (e.g., carboxy methylcellulose) that are formed, cut or spun to the desired size and shape, and then dried to retain the desired configuration. However, such "pellets" or "beads" may comprise any suitable elements, or combination of elements, meeting the preferred aspects as disclosed herein. For example, some or all of the beads or pellets can comprise spherical capsules that are heat sensitive, so that when included in the aerosol-generating element and exposed to heat, the rupture or decomposition thereof causes the release of glycerin, water, saline, tobacco flavor and/or nicotine or other substances or additives. Also, the beads can comprise ceramic or absorbent clay or silica or absorbent carbon to hold and release an aerosol former. Further, in some aspects, the beads/pellets may comprise a heat conductive material such as, for example, heat conductive graphite, heat conductive ceramic, a metal, tobacco cast on foil, a metal or other suitable material impregnated with appropriate aerosol-generating substances such as glycerin and flavor(s), or a suitable cast sheet material appropriately formed into the desired beads/pellets.

In one particular example, the beads/pellets (particles) may be comprised of between about 15% and about 60% of finely milled tobacco (e.g., a blend of Oriental, burley and flue-cured tobaccos, essentially all Oriental tobacco, essentially all burley tobacco, or essentially all flue-cured tobacco), between about 15% and about 60% of finely milled particles of calcium carbonate (or finely milled clay or ceramic particles), between about 10% and about 50% of glycerol (and optionally a minor amount of flavors), between about 0.25% and about 15% of a binder (preferably carboxymethylcellulose, guar gum, potassium, or ammonium alginate), and between about 15% and about 50% of water. In another example, the beads/pellets (particles) may be comprised of about 30% of finely milled tobacco (e.g., a blend of Oriental, burley and flue-cured tobaccos, essentially all Oriental tobacco, essentially all burley tobacco, or essentially all flue-cured tobacco), about 30% of finely milled particles of calcium carbonate (or finely milled clay or ceramic particles), about 15% of glycerol (and optionally a minor amount of flavors), about 1% of a binder (preferably carboxymethylcellulose, guar gum, potassium, or ammonium alginate), and about 25% of water. In such examples, the particles may be compressed to hold the glycerol and, upon compression, may form a porous matrix that facilitates migration of the aerosol generating components to promote efficient aerosol formation. The manner by which the aerosol forming material is contacted with the substrate material can vary. The aerosol forming material can be applied to a formed material, can be incorporated into processed materials during manufacture of those materials, or can be endogenous to that material. Aerosol-forming material, such as glycerin, can be dissolved or dispersed in an aqueous liquid, or other suitable solvent or liquid carrier, and sprayed onto that substrate material. See, for example, U.S. Patent Appl. Pub. No. 2005/0066986 to Nestor et al. and U.S. Patent Appl. Pub. No. 2012/0067360 to Conner et al.; which are incorporated herein by reference. The calcium carbonate or other inorganic filler assists in creating porosity within the particles, and may also function to absorb heat which may, in some instances limit or otherwise prevent scorching of the aerosol generating components, as well as assisting in and promoting aerosol formation. See also, for example, those types of materials set forth in U.S. Pat. No. 5,105,831 to Banerjee, et al., and U.S. Pat. App. Pub. No. 2004/0173229 to Crooks et al.; U.S. Pat. App. Pub. No. 2011/0271971 to Conner et al.; and U.S. Pat. App. Pub. No. 2012/0042885 to Stone et al.; which are incorporated herein by reference.

In some aspects, where the aerosol-generating elements 425 comprise, for example, beads or pellets cast or extruded from materials of the various types set forth above (i.e., a graphite bead including tobacco extract and glycerin), while "damp" or otherwise before drying, may be rolled, for example, between adjacent roller elements, to flatten the shape of the respective beads/pellets. In some instances, the materials of the various types set forth above may be extruded in the form of filamentary strands, wherein the strands may be gathered to form a cylindrical rod or other suitably shaped material (i.e., relative in size to the beads/pellets used to otherwise form the aerosol generation segment) for application in the second aerosol generation arrangement 400. Upon drying, the flattened beads/pellets may then be shredded or otherwise processed to form, for example, strands, flakes, or other filler configuration that is flat or includes a planar segment that inhibits or prevents roll. Any random configurations resulting form the shredding process may be sufficient. In such instances, the flattened and shredded beads/pellets may then be included in the aerosol-generating element(s) 425, and the irregular or random configurations thereof may promote, for instance, a plurality of interstitial air spaces throughout the aerosol-generating element(s) 425, wherein the interstitial air spaces may, in turn, promote heat transfer with the individual objects within the aerosol-generating element(s) 425. That is, heating of the air in the interstitial spaces within the second aerosol generation arrangement 400 may expose more of the aerosol-generating element(s) 425 to the heat from the heating element 240, and thus result in enhanced or otherwise improved heating of the aerosol-generating element(s) 425. In other instances, the heat and the first aerosol (i.e., the combination thereof) produced by the heating element 240/atomizer 212 are directed through the porous matrix formed by the aerosol-generating element(s) 425, wherein the heated vapors passing through and heating the porous aerosol-generating element(s) 425 promotes, for example, elution (i.e., liquid, fluid, or particulate extraction; steam distillation; etc.) of an enhancement substance (i.e., a flavorant or other additive) from the aerosol-generating element(s) to the first aerosol, or otherwise promotes the enhancement substance being entrained in, imparted to, reacted with, or otherwise interacted with the first aerosol. The interaction between the enhancement substance and the first aerosol may, for example, change or alter the first aerosol, mix the enhancement substance with the first aerosol to form an enhanced aerosol or aerosol mixture, or facilitate a reaction that produces a different aerosol. In such instances, increased interstitial spaces within the aerosol-generating element(s) 425 may promote this interaction process through the second aerosol generation arrangement 400.

In some aspects, the beads/pellets may originate from a tobacco material cast on a foil/paper laminate. More particularly, the tobacco material may comprise, for example, a slurry including reconstituted tobacco, glycerin, and a binder material. Such a tobacco material is disclosed, for example, in U.S. Pat. No. 5,101,839 to Jakob et al. and U.S. Patent Application No. 2010/0186757 to Crooks et al., which are incorporated herein by reference. In addition, the slurry can incorporate granular inorganic material (i.e., calcium carbonate). The slurry is cast unto a paper element of a foil-paper laminate, such as disclosed, for example, in U.S. Pat. No. 8,678,013 to Crooks et al. and U.S. Pat. No. 7,647,932 to Cantrell et al., which is also incorporated herein by reference, and the assembled cast sheet product is then dried, for instance by the application of heat (i.e., by heated air, microwave drying, etc.). The paper element may have, for instance, a particular porosity or texture to promote an intimate contact and interaction with the slurry, for instance, over direct contact between the slurry and the foil. However, the exemplary aspect presented herein does not preclude casting the tobacco material (i.e., slurry) directly on a metal foil or other suitable thin film heat conductor. Once such a laminate is cast, the dried cast sheet (i.e., the foil/paper/tobacco material) may be shredded, diced, or otherwise separated into a plurality of cast sheet portion elements, wherein each such element preferably includes a portion of the tobacco material (i.e., the substrate) intimately interacted with a portion of the paper element which, in turn, is in intimate contact with a portion of the foil element of the foil-paper laminate. A plurality of the cast sheet portion elements may then be included in the aerosol-generating element(s) 425 forming the second aerosol generation arrangement 400.

One skilled in the art will appreciate that, in some circumstances, the cast sheet portion elements included in the aerosol-generating element(s) 425 may cooperate to promote improved heat transfer to the tobacco material forming a portion of those cast sheet portion elements or otherwise to abutting elements. More particularly, in some instances, heat transfer from the heating element 240 to the tobacco material included in the aerosol-generating element(s) 425 may be limited past any direct interface therebetween, with the heat-conducting strip forming an additional mechanism for conducting heat from the heating element 240 for heating the outer elements included in the aerosol-generating element(s) 425 and any aerosol-generating element(s) in contact therewith. In aspects including the cast sheet portion elements included in the aerosol-generating element(s) 425, the heat-conductive portions of the foil element associated with the cast sheet portion elements may form, for example, a plurality of additional heat conductive pathways. That is, the cast sheet portion elements used as all or part of the aerosol-generating element(s) 425 may provide additional heat-conductive elements interspersed throughout the aerosol-generating element(s) 425 within the second aerosol generation arrangement 400 to thereby enhance or otherwise improve heat transfer to and between the aerosol-generating elements. In achieving such an aspect, it may be further advantageous to shred or process a substrate material implemented in, for example, the cast tobacco sheet substrate material forming the substrate incorporated within the types of cigarettes commercially marketed under the trade name "Eclipse" by R. J. Reynolds Tobacco Company, as disclosed, e.g., by U.S. Pat. No. 5,469,871 to Barnes et al.

The pellets or other elements may have smooth, regular outer shapes (e.g., spheres, cylinders, ovoids, or the like) and/or they may have irregular outer shapes (e.g., shredded pieces, flakes, or the like). The aerosol-generating element(s) 425, discretely or cumulatively, may have a generally cylindrical form within the second aerosol generation arrangement 400, and may in some instances include a collection of about 800 to about 1200 generally spherical beads, each having a mean or nominal diameter of about 0.05 mm to about 2 mm (e.g., about 1 $mm^3$ in volume, in one example), with the beads/pellets cumulatively weighing about 450 mg to about 750 mg (e.g., 600 mg±25%, in one example). Preferably, sufficient beads are loaded into the second aerosol generation arrangement 400 to provide at least about 95 percent of maximum fill, with beads and/or other suitable elements. In some instances, a plurality of forms of the aerosol-generating element(s) 425 may be selected, and each selected form of the aerosol-generating elements then subsequently included in the second aerosol generation arrangement 400. In other instances, the selected forms of the aerosol-generating elements may be combined, prior to inclusion in the second aerosol generation arrangement 400, to produce an aerosol-generating element mixture, and the mixture then subsequently included in the second aerosol generation arrangement 400.

The atomizer or first aerosol generation arrangement 212 and the second aerosol generation arrangement 400 may be physically separate from one another and/or comprise discrete units or segments within the cartridge body 200. In some instances, as shown, those segments may be positioned/disposed so that the downstream end (toward the mouthpiece or mouth-engaging end 220 of the cartridge body 200) of the atomizer or first aerosol generation arrangement 212 is adjacent to the upstream end of the second aerosol generation segment 400 (i.e., the back face of the aerosol-generating element(s) 425). That is, the atomizer or first aerosol generation arrangement 212 and the second aerosol generation segment 400 may be axially aligned in a serial end-to-end relationship, in some instances adjacent to or abutting one another. For example, in some instances, though physically discrete and positioned downstream from the atomizer or first aerosol generation arrangement 212, it may be desirable for the aerosol-generating element(s) 425 of the second aerosol generation arrangement 400 to physically contact the heating element 240 at the downstream end of the atomizer or first aerosol generation arrangement 212. Alternatively, those segments 212, 400 can be slightly spaced apart from one another such that the respective ends or components thereof 240, 425 are not necessarily in physical contact with the other (i.e., to prevent scorching). One skilled in the art will appreciate that, in some aspects, the second aerosol generation arrangement 400 may comprise more than one section or portion of aerosol-generating element(s) 425.

In some instances, an additional segment, spacer element, or separating element (otherwise referred to herein as "a first separating element"), acting as a spacer or screen (see, e.g., element 450 in FIG. 3) may be positioned generally perpendicular to the longitudinal axis of the cartridge body 200, wherein the first separating element 450 may provide for physical separation of those two segments 212, 400 while, in some instances, maintaining a heat conductive relationship therebetween. The first separating element 450 may, in some instances, not be conductive to heat and, in other instances, the first separating element 450 may not be electrically conductive. That is, the first separating element 450 may, but not necessarily, be heat-conductive and/or arranged to conduct heat from the heating element 240 of the atomizer/first aerosol generation arrangement 212 to the second aerosol generation arrangement 400, wherein the aerosol-generating element(s) 425 may be responsive to the heat and/or accompanying first aerosol to form a second aerosol. Further, in some instances, the first separating element 450 may be air permeable or otherwise configured to permit airflow therethrough, such that a first aerosol generated by the atomizer/first aerosol generation arrangement 400 can pass therethrough in the downstream direction. The first separating element 450 may thus also be configured and/or arranged so as to maintain the aerosol-generating element(s) 425 within the second aerosol generation arrangement 400 and separate from the atomizer/first aerosol generation arrangement 212. In still further instances, the first separating element 450 may be configured as a spacer (i.e., extending in a longitudinal direction along the cartridge body 200 so as to define a thickness) for separating the aerosol-generating element(s) 425 from the heating element 240 of the atomizer/first aerosol generation arrangement 212, for example, to minimize or prevent the aerosol-generating element(s) (i.e., beads) 425 from being scorched or burned by the heat from the heating element 240. In some instances, the first separating element 450 may also be configured as an insulator (i.e., not electrically conductive) to prevent short-circuiting of the heating element 240 in the event of contact therebetween.

Typically, the first separating element 450 is generally cylindrical or discoid in shape and of one piece construction, and is air permeable to allow the passage of drawn air through. The first separating element 450 may be heat conductive in nature, so that heat generated by the heating element 240 can be readily conducted to the second aerosol generation arrangement 400. The length (thickness) of the first separating element 450 can vary, and typically extends from about less than 1 mm up to about 10 mm. In some instances, the thickness of the first separating element 450 and/or the relative longitudinal placement of the first separating element 450 within the outer body 216, spaces the interface of the first separating element 450 with the aerosol-generating element(s) 425 at between about 1 mm and up to about 20 mm (i.e., 7 mm in one example) away from the heating element 240. Typically, the first separating element 450 is comprised of a heat resistant material, such as a porous ceramic, a porous graphite material, a metal (i.e., stainless steel, brass, copper, etc.) mesh or screen, a high temperature-resistant plastic or the like. In some instances, the first separating element 450 may include, for example, longitudinally-extending air passageways formed during design/manufacture, drilled therethrough, or otherwise molded, extruded, printed (i.e., a 3D printed element using a 3D printer), or shaped into the spacer element during manufacture thereof. If desired, the first separating element 450 can incorporate catalytic materials, such as materials incorporating cerium or copper ions or oxides and/or salts of cerium and copper ions. See, for example, U.S. Pat. Nos. 8,469,035 and 8,617,263 to Banerjee et al. and U.S. Pat. Appl. Pub. No. 2007/0215168 to Banerjee et al., which are incorporated herein by reference.

In instances where the aerosol-generating element(s) 425 may be circumscribed by an insulation layer, a layer of heat conductive material (e.g., a layer or strip comprised of metal foil) may be provided therebetween (not shown). That is, representative aerosol-generating element(s) 425 include a plurality of pellets and/or other appropriate elements that can be circumscribed along its length by a layer of strip of metal foil. A representative metal foil is, for example, aluminum foil having a thickness of about 0.01 mm to about 0.05 mm. Preferably, the metal foil extends along the entire length of the outer co-axial surface of the aerosol-generating element(s) 425; and it may be preferred that the metal foil extends over (i.e., at least partially overlaps) the first separating element 450. The heat conductive material can be provided by means other than the use of metal foil. For example, the layer of metal foil can be replaced by a metal mesh or screen. Alternatively, the metal foil can be replaced by a heat conductive fabric, such as a layer or sheet of graphite fibers or heat conductive ceramic fibers. Alternatively, the heat conductive material can be provided by application of a heat conductive ink, such as a coating of ink or paint that incorporates metal particles, graphite fibers, particles of heat conductive ceramic materials, or the like.

In some aspects, another spacer element, or another separating element (otherwise referred to herein as "a second separating element"), acting as a spacer or screen (see, e.g., element 475 in FIG. 3) may be positioned generally perpendicular to the longitudinal axis of the cartridge body 200, wherein the second separating element 475 may provide for physical separation of the second aerosol generation arrangement 400 from the mouthpiece or mouth-engaging end 220 of the cartridge body 200. That is, the second separating element 475 may, but not necessarily, be heat-conductive and/or arranged to conduct heat from the second aerosol generation arrangement 400 and through the mouthpiece or mouth-engaging end 220 of the cartridge body 200. However, the second separating element 475 may be air permeable or otherwise configured to permit airflow therethrough, such that a first aerosol generated by the atomizer/first aerosol generation arrangement 212 and/or a second aerosol generated by the second aerosol generation arrangement 400, can pass therethrough in the downstream direction and through the mouthpiece or mouth-engaging end 220 of the cartridge body 200. The second separating element 475 may thus also be configured and/or arranged so as to maintain the aerosol-generating element(s) 425 within the second aerosol generation arrangement 400, without loss of any of the aerosol-generating element(s) through the mouthpiece or mouth-engaging end 220 of the cartridge body 200.

In some aspects, in the alternative to discrete first and second separating elements 450, 475 being implemented in addition to the aerosol-generating element(s) 425, the second aerosol generation arrangement 400 may comprise a cartridge 500 (see, e.g., FIG. 4) having an elongate tubular body 525 and opposed end members 550, 575, wherein each of the end members 550, 575 may be heat-conductive and/or air permeable in a similar manner to the first and second separating elements 450, 475. The elongate tubular body 525 may thus be further configured to receive the aerosol-generating element(s) 425 and to cooperate with the opposed end members 550, 575 to contain the aerosol-generating element(s) 425 therein. The assembled cartridge 500 may thus be configured to be received as a unit (forming the second aerosol generation arrangement 400) by the outer body or tubular member 216 of the cartridge body 200.

In use, the mouthpiece or mouth-engaging end 220 of the cartridge body 200 of the aerosol delivery system 100 is inserted into the mouth of the user. The atomizer/first aerosol generation arrangement 212 is then actuated, for example, by the user drawing (e.g., a suction) on the mouthpiece or mouth-engaging end 220 of the cartridge body 200. The heating element 240 and the liquid transport element 238 are configured so as to be in a heat exchange relationship. That is, the heat generated by the heating element 240 acts to heat the aerosol precursor composition carried by the liquid transport element 238 to produce a first aerosol. The heat generated by the heating element 240 and the first aerosol are then drawn into engagement with and through the second aerosol generation arrangement 400 (i.e., through the aerosol-generating element(s) 425) toward the inhalation hole defined by the mouthpiece or mouth-engaging end 220. In some instances, the heat from the heating element 240 may interact with the aerosol-generating element(s) 425 to generate a second aerosol. The second aerosol may interact or mix with the first aerosol to form a tertiary aerosol, the tertiary aerosol being the aerosol delivered to the user by way of the mouthpiece 220 in response to the draw imparted thereto by the user. In some instances, the interaction between the heat and/or the first aerosol and the aerosol-generating element(s) 425 may cause an enhancement substance to be imparted to the first aerosol so as to produce an enhanced aerosol. For example, a medicament adsorbed on the aerosol-generating element(s) 425 may react with the first aerosol and/or the heat, or otherwise be de-adsorbed from the aerosol-generating element(s) 425 by the first aerosol and/or the heat, and combine with the first aerosol to form the enhanced aerosol. In still other instances, the aerosol-generating element(s) 425 may be configured such that interaction of the first aerosol therewith causes heat to be drawn away from the first aerosol (i.e., cooling of the first aerosol). When appropriately implemented by the user, at least the first aerosol generated by the atomizer 212 and affected by the second aerosol generation arrangement 400 aerosol are generated and drawn into the mouth of the user.

The components of the second aerosol generation arrangement 400 and/or the aerosol-generating element(s) 425 therein can vary. In general, the second aerosol generation arrangement 400 and/or the aerosol-generating element (s) 425 therein may incorporate components that can be vaporized, aerosolized or entrained in air drawn through the aerosol delivery system 100 during use. Most preferably, those components, by themselves or in cooperation with the first aerosol produced by the first aerosol generation arrangement 212, provide sensory and organoleptic effects, such as aroma, flavor, mouthfeel, visible aerosol sensations, and the like. Examples of components of the first and/or second aerosol generation arrangement 212, 400 that are drawn into the mouth of the user during draw include water (e.g., as water vapor), visible or not visible aerosol forming materials (e.g., glycerin), various volatile flavors (e.g., vanillin and menthol), volatile components of tobacco (e.g., nicotine), and the like.

A preferred aerosol-forming material produces an aerosol (whether visible or not) upon the application of sufficient heat thereto, or otherwise through the action of aerosol forming conditions using components of the aerosol delivery system. A preferred aerosol-forming material produces a visible aerosol that can be considered to be "smoke-like." A preferred aerosol-forming material is chemically simple, relative to the chemical nature of the smoke produced by burning tobacco. A preferred visible aerosol-forming material is a polyol, and exemplary preferred aerosol forming materials include glycerin, propylene glycol, and mixtures thereof. If desired, aerosol forming materials can be combined with other liquid materials, such as water. For example, aerosol forming material formulations can incorporate mixtures of glycerin and water, or mixtures of propylene glycol and water. See, for example, the various aerosol forming materials referenced in U.S. Pat. No. 8,678,013 to Crooks et al., which is incorporated herein by reference.

The aerosol forming materials are carried or supported by substrate materials so as to maintain those aerosol materials within the desired region of the smoking article. Exemplary substrate materials, and exemplary formulations incorporating aerosol-forming materials, are set forth in U.S. Pat. No. 4,793,365 to Sensabaugh et al.; U.S. Pat. No. 4,893,639 to White; U.S. Pat. No. 5,099,861 to Clearman et al.; U.S. Pat. No. 5,101,839 to Jakob et al.; U.S. Pat. No. 5,105,836 to Gentry et al.; U.S. Pat. No. 5,159,942 to Brinkley et al.; U.S. Pat. No. 5,203,355 to Clearman et al.; U.S. Pat. No. 5,271,419 to Arzonico et al.; U.S. Pat. No. 5,327,917 to Lekwauwa et al.; U.S. Pat. No. 5,396,911 to Casey, III et al.; U.S. Pat. No. 5,533,530 to Young et al.; U.S. Pat. No. 5,588,446 to Clearman; U.S. Pat. No. 5,598,868 to Jakob et al.; and U.S. Pat. No. 5,715,844 to Young et al.; and U.S. Patent Application Pub. No. 2005/0066986 to Nestor et al.; which are incorporated herein by reference. See, also, Chemical and Biological Studies on New Cigarette Prototypes that Heat Instead of Burn Tobacco, R. J. Reynolds Tobacco Company Monograph (1988). Exemplary substrate materials have been incorporated within the types of cigarettes commercially marketed under the trade names "Premier" and "Eclipse" by R. J. Reynolds Tobacco Company.

In some instances, the aerosol delivery system described with reference to FIG. 1 may be used in much the same manner as commercially marketed e-cigarettes. As a result, when smoked, a preferred aerosol delivery system 100 of the types disclosed herein may yield visible mainstream aerosol resulting principally from volatilized components of the first and second aerosol generation arrangements 212, 400, and that visible aerosol resembles in many regards the mainstream tobacco smoke of a traditional type of cigarette that burns tobacco cut filler.

Many modifications and other aspects of the disclosures set forth herein will come to mind to one skilled in the art to which these disclosures pertain having the benefit of the teachings presented in the foregoing descriptions and the associated drawings. For example, those of skill in the art will appreciate that embodiments not expressly illustrated herein may be practiced within the scope of the present disclosure, including that features described herein for different embodiments may be combined with each other and/or with currently-known or future-developed technologies while remaining within the scope of the claims presented here.

In another example, substantially the entirety of the cartridge body 200 may be formed from one or more carbon materials (see, e.g., FIG. 5), which may provide advantages over other cartridge body configurations disclosed herein in terms of biodegradability and absence of wires. In this regard, the heating element may comprise carbon foam, the reservoir may comprise carbonized fabric, and graphite may be employed to form an electrical connection with the battery and controller. Examples of a carbon-based cartridge body are provided in U.S. patent application Ser. No. 14/011,992, filed Aug. 28, 2013; or in U.S. Pat. App. Pub. No. 2013/0255702 to Griffith et al., which is incorporated herein by reference in its entirety. In some instances, the incorporation of the second aerosol generation arrangement disclosed herein may also be applicable to such a carbon-based cartridge body. For example, as shown in FIGS. 6A and 6B, the portion 625 (see, e.g., FIG. 6A) of the cartridge element 600 disposed toward the mouthpiece of the cartridge body may be configured or otherwise altered (see, e.g., FIG. 6B) so as to receive one or more of the aerosol-generating element(s) 425 of the types disclosed herein. In the alternative, a pre-assembled cartridge including such aerosol-generating element(s) 425 may be implemented, or the cartridge element 600 and/or the outer body receiving the cartridge element 600 may be configured to receive the first and second separating elements having the aerosol-generating elements therebetween, as otherwise disclosed herein.

Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. An aerosol delivery device comprising:
- an outer body;
- a plurality of metal coils positioned in the outer body and configured to receive electrical energy from a power source;
- a cartridge arranged as an elongate tubular body and configured to be received as a unit by the outer body, wherein the cartridge comprises:
  - tobacco material positioned within the elongate tubular body;
  - a first element arranged relative to the tobacco material so as to transfer heat to the tobacco material and generate aerosol when the plurality of metal coils in the outer body receive electrical energy from the power source, the first element being comprised of a porous ceramic, a porous graphite material, a metal mesh or screen, or a plastic and being of one piece construction; and
  - a second element configured to permit airflow therethrough and arranged relative to the tobacco material so that the aerosol from the tobacco material can pass therethrough in a downstream direction;
  - wherein the first element defines a first end member arranged at an end of the cartridge, the second element defines a second end member arranged at an opposed end of the cartridge, and one or both of a thickness of the first element and a longitudinal placement of the first element within the outer body spaces an interface of the first element and the tobacco material at about 1 mm to about 20 mm away from the plurality of metal coils.

2. The aerosol delivery device of claim 1, wherein the tobacco material includes one or more flavors combined therewith.

3. The aerosol delivery device of claim 1, wherein the tobacco material comprises one or more aerosol forming materials combined therewith.

4. The aerosol delivery device of claim 3, wherein the aerosol forming materials comprise one or more of glycerin, propylene glycol, and water.

5. The aerosol delivery device of claim 1, wherein the tobacco material comprises one or both of reconstituted tobacco shreds and expanded tobacco shreds.

6. The aerosol delivery device of claim 1, wherein the first element comprising the metal has a thickness of less than 1 mm.

7. The aerosol delivery device of claim 1, wherein the power source is positioned in the outer body.

8. The aerosol delivery device of claim 1, further comprising a circuit board positioned in the outer body.

9. The aerosol delivery device of claim 8, further comprising a light emitting diode on the circuit board.

10. The aerosol delivery device of claim 1, wherein the plurality of metal coils comprises one or more of iron, chromium, and aluminum.

11. An aerosol delivery device comprising:
- an outer body;
- a plurality of metal coils positioned in the outer body and configured to receive electrical energy from a power source;
- a circuit board positioned in the outer body;
- a light emitting diode in communication with the circuit board and arranged so that illumination from the light emitting diode is visible through the outer body or a part thereof; and
- a cartridge arranged as an elongate tubular body and configured to be received as a unit by the outer body, wherein the cartridge comprises:
  - tobacco material positioned within the elongate tubular body;
  - a first element arranged relative to the tobacco material so as to transfer heat to the tobacco material and generate aerosol when the plurality of metal coils in the outer body receive electrical energy from the power source, the first element being a metal or ceramic of one piece construction; and a second element configured to permit airflow therethrough and arranged relative to the tobacco material so that the aerosol from the tobacco material can pass therethrough in a downstream direction.

12. The aerosol delivery device of claim 11, wherein the light emitting diode is configured for illumination at least when a user draws on the aerosol delivery device.

13. The aerosol delivery device of claim 12, wherein the user drawing on the aerosol delivery is detected by a sensor arranged in the outer body.

14. The aerosol delivery device of claim 11, comprising a plurality of light emitting diodes.

15. The aerosol delivery device of claim 11, wherein the first element has a thickness of less than 1 mm.

16. The aerosol delivery device of claim 11, wherein one or more of the following conditions is met:

the tobacco material includes one or more flavors combined therewith;

the tobacco material comprises one or more aerosol forming materials combined therewith;

the tobacco material comprises one or both of reconstituted tobacco shreds and expanded tobacco shreds.

17. The aerosol delivery device of claim 11, wherein the power source is positioned in the outer body.

18. The aerosol delivery device of claim 11, wherein the plurality of metal coils comprises one or more of iron, chromium, and aluminum.

* * * * *